No. 889,504. PATENTED JUNE 2, 1908.
A. J. BERG.
CAR FENDER.
APPLICATION FILED JUNE 22, 1907.
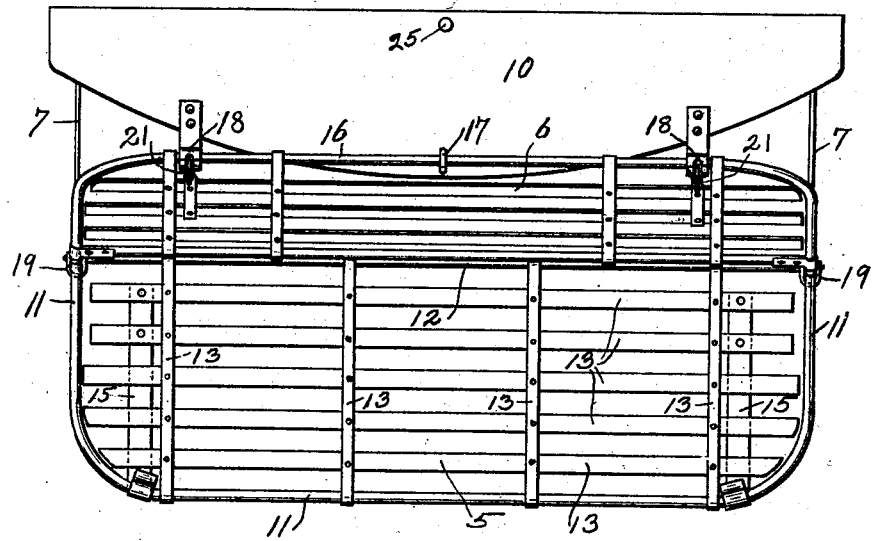
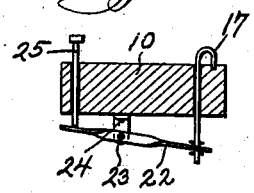
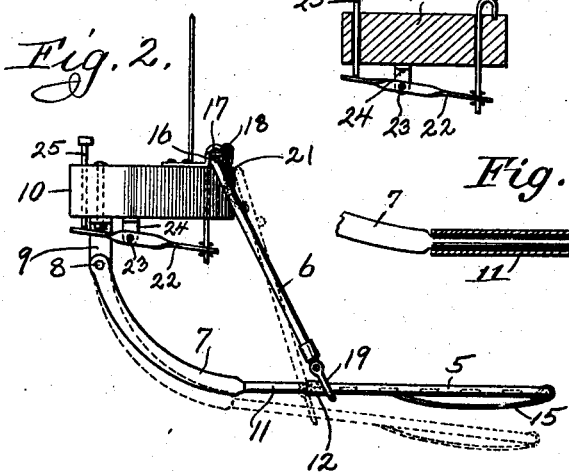
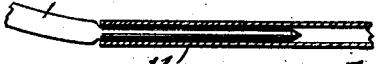
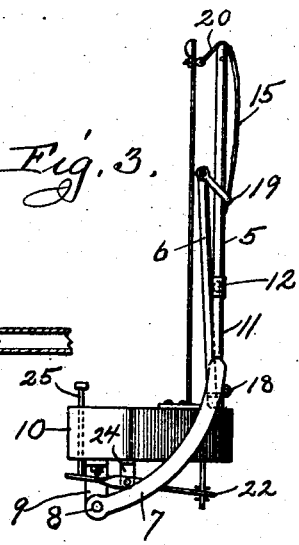
Witnesses:
M. L. Brown
Milton Lenoir
Inventor:
August J. Berg.
By R. J. Jacker
Atty.

UNITED STATES PATENT OFFICE.

AUGUST J. BERG, OF CHICAGO, ILLINOIS.

CAR-FENDER.

No. 889,504.　　　　Specification of Letters Patent.　　　　Patented June 2, 1908.

Application filed June 22, 1907. Serial No. 380,365.

*To all whom it may concern:*

Be it known that I, AUGUST J. BERG, a citizen of the United States, residing at Chicago, in the county of Cook and State of Illinois, have invented a new and useful Car-Fender, of which the following is a specification.

My invention relates to car fenders which are attached to the front end of a car and can be folded up out of the way when not used, and the objects of my improvements are, first, to make a fender which is easily attached to a car; second, to arrange the horizontal and upright parts so that the lower end of the upright part will slide on the horizontal part when the fender is raised or lowered; third, to eliminate all brackets and bars, whereon a passenger may stand, when the fender is folded up; fourth, to provide a fender which can easily be dropped to the ground by the motorman at any time; fifth, to make a cheap effective and durable construction and other objects to become apparent from the description to follow.

My invention is designed to prevent injury to human beings. From experience with devices of this class it is found that some which have been constructed are so elaborate and expensive that the car operators could not afford to equip the cars with them, some were so constructed that often the person struck by the fender would be rolled and crushed beneath the same; some were so constructed that when folded up against the car end they would afford numerous braces, rods and brackets upon which passengers crowded from the car platform would stand and be injured; and some were so constructed that when they were broken or bent out of shape it required a tool of some kind to disconnect it from the car and thus cause a long delay; these are some of the objections which are overcome by my invention.

It consists of a horizontal portion extending beyond the end of the car and attached to the car by two rearwardly extending arms which are curved upward and pivotally secured to the under side of the car. This horizontal portion is held up above the ground by an upright apron which is pivotally secured to the front end of the car platform and has its lower end provided with a loop or ring on either side arranged to slide on the side rails of the horizontal portion.

To describe my invention so that others versed in the art to which it pertains may make and use the same I have illustrated it on the accompanying sheet of drawing, forming a part of this invention in which:

Figure 1, is a plan view of a fender embodying my invention attached to a car; Fig. 2, is a side elevation of the same; Fig. 3, is a similar view but with the fender folded up, and Figs. 4 and 5 are sectional detail views.

Similar reference characters refer to identical parts throughout the several views.

The fender proper consists of the horizontal portion 5, and the upright apron 6. The fender 5 has the two rearwardly extending arms 7 which are curved upward and pivoted at 8 to the depending brackets 9 secured to the underside of the car platform 10. The lower forward ends of the arms 7 are round in cross section so as to fit loosely into the pipe 11 which is bent into a U shape and forms the sides and front end of the fender 5. A pipe 12 has its ends rigidly secured to pipe 11 near its ends and forms the rear edge of the fender 5. A plurality of straps 13 are fastened to span the space between the pipe 12 and the pipe 11, forming the front edge of the fender 5, and a plurality of slats 14 are fastened to the straps 13 which form the body of the fender 5. I prefer also to have the sheet iron shoes 15 secured to the fender 5.

It is clear from the description thus far given that fender 5 is free to swing in an arc about the pivots 8 and is also free to be moved forward away from the car, thereby slipping the ends of the arms 7 out of the ends of pipe 11; see Fig. 5.

The apron 6 serves to prevent any object, picked up by the fender 5, from passing underneath car, and also serves to support the fender 5 the required distance above the ground. To do this the apron 6 is made with a round bar or pipe 16 forming its upper edge as seen in Figs. 1 and 2, which rests on the middle front end of the car platform 10 and is prevented from slipping off forward by the hook shaped bolt 17 clearly shown in Fig. 4. The apron 6 is prevented from moving up, by the jolting of the car or any other reason, by the pipe 16 sliding under the overhanging hooks or braces 18 secured to the car platform 10. The lower end of the apron 6 is provided with two loops 19 which extend around the pipe 11 forming the sides of the fender 5 and are arranged to slide freely along on said pipe. When the fender is in its lowered position the loops 19 slide rearwardly on the fender pipe 11 and come to rest against the cross pipe 12 or any other stop provided for the purpose as seen in Figs. 1 and 2; and when the fender is in its raised position the loops 19 will be slipped along on the fender pipe 11 some distance forward of the pipe 12 as seen in Fig. 3. A hook 20 secured to the front of the car is used to hold the fender in a raised position.

The lower end of the apron 6 being somewhat forward of the upper end, the natural tendency is for the pipe 16 to slide forward off of the car platform 10 thereby dropping too close to the ground. I attach a short chain 21 between the apron 6 and the car platform 10, preferably by placing a split pin in an eye formed on the extremities of the hooks 18.

To provide means whereby the motorman can drop the fender 5 at will, the bolt 17 is extended down through a loose fitting hole in the car platform 10, and its lower end is loosely connected to one end of a lever 22 pivoted midway its length at 23 to a bracket 24 secured to the car platform 10. The other end of the lever 22 is arranged to be engaged by the lower end of a bolt or rod 25 fitting loosely in a hole extending entirely through the platform 10 and having its upper end normally some distance above the platform. The bolts 17 and 25 and the lever 22 are so constructed that the normal position of the parts will be with the bolt 17 in its lower position and the bolt 25 in its upper position. When the bolt 25 is depressed the bolt 17 is raised and releases the pipe 16 forming the upper edge of the apron 6; the apron 6 drops until it is supported by the chains 21, thus lowering the fender 5 to the ground as shown by dotted lines in Fig. 2.

Should the fender by accident or otherwise become bent or broken it can be detached from the car in a few moments by removing the split pins from the hooks or brackets 18 and sliding arms 11 forward.

Having thus fully described my invention what I claim as new and desire to secure by Letters Patent of the United States is:—

1. In a fender, a horizontal portion having two rearwardly extending arms bent upward and pivotally secured to the car and an apron having sliding and supporting engagement with said horizontal portion.

2. In a fender, a horizontal portion having two hollow side frames, two arms pivotally secured to the car having their forward ends loosely fitting into said two hollow side frames so as to be free to be withdrawn and disconnected therefrom and means for supporting said horizontal portion.

3. In a fender, a horizontal portion having two side frames capable of having rods inserted and withdrawn so that said side frames and said rods are free to be separated and disconnected, two arms pivotally secured to the car having their front ends terminating in rods loosely fitting into said two side frames, and means for supporting said horizontal portion.

4. In a fender, a horizontal portion having two hollow side frames, two arms pivotally secured to the car having their forward ends loosely fitting into said two hollow side frames so as to be free to be withdrawn and disconnected therefrom and an apron having sliding and supporting engagement with said horizontal portion.

5. In a fender, a horizontal portion having two side frames capable of having rods inserted and withdrawn from the rear so that said side frames and said rods are free to be separated and disconnected, two arms pivotally secured to the car having their front ends terminating in rods loosely fitting into said two side frames and an apron having sliding and supporting engagement with said horizontal portion.

6. In a fender, a horizontal portion having two rearwardly extending arms bent upwardly and pivotally secured to the car, an apron having sliding and supporting engagement with said horizontal portion, and means for securing said apron in either of two positions.

7. In a fender, a horizontal portion having two rearwardly extending arms bent upwardly and pivotally secured to the car, an apron having sliding and supporting engagement with said horizontal portion attached to the car platform, means for holding said apron in its normal position whereby said horizontal portion is held a material distance above the ground and means for lowering said apron a predetermined distance whereby said horizontal portion is lowered a predetermined distance to be close to the ground.

8. In a fender, a horizontal portion having two rearwardly extending arms pivotally secured to the car, an apron having sliding and supporting engagement with said horizontal portion attached to the car platform, means to prevent said apron from dropping below a certain point, and means comprising a releasing bolt for securing said apron in its normal elevated position.

9. In a fender, a horizontal portion having two rearwardly extending arms bent upward and pivotally secured to the car, an apron having its upper end adjustably secured to the car to support the front end of said horizontal portion, a catch for securing said apron in its normal position and means for tripping said catch whereby said apron and horizontal portion are automatically dropped a predetermined distance.

In testimony whereof I have signed my name to this specification in presence of two subscribing witnesses this 15th day of June, 1907, at Chicago, Illinois.

AUGUST J. BERG.

Witnesses:
   R. J. JACKER,
   MILTON LENOIR.